(12) United States Patent
Paumier

(10) Patent No.: US 7,007,414 B2
(45) Date of Patent: *Mar. 7, 2006

(54) VERTICAL UNDERGROUND STUMP GRINDING APPARATUS

(75) Inventor: James J. Paumier, North Canton, OH (US)

(73) Assignee: New River Equipment Corporation, Smithville, OH (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/846,385

(22) Filed: May 15, 2004

(65) Prior Publication Data

US 2004/0211097 A1 Oct. 28, 2004

Related U.S. Application Data

(63) Continuation-in-part of application No. 10/305,541, filed on Nov. 27, 2002, now Pat. No. 6,751,895.

(51) Int. Cl.
*A01G 23/06* (2006.01)
(52) U.S. Cl. .................... 37/302; 144/24.12
(58) Field of Classification Search .......... 37/301, 37/302, 188, 189; 144/24.12, 34.1, 334, 144/335; 299/39.4, 78; 241/101.72; 414/694, 414/685
See application file for complete search history.

(56) References Cited

U.S. PATENT DOCUMENTS

| | | | |
|---|---|---|---|
| 1,012,962 A | 12/1911 | Anderson | |
| 1,104,535 A | 7/1914 | Moore et al. | |
| 1,164,659 A | 12/1915 | Moore et al. | |
| 1,466,538 A | 8/1923 | McKoy et al. | |
| 2,710,634 A | 6/1955 | O'Brien | |
| 2,923,332 A | 2/1960 | Osmun | |
| 3,818,957 A | 6/1974 | Schoonover | |
| 4,637,442 A | 1/1987 | Mozer | |
| 5,203,388 A | 4/1993 | Bowling | |
| 5,887,634 A | 3/1999 | Theisen | |
| 6,435,234 B1 | 8/2002 | Paumier | |

OTHER PUBLICATIONS ceattachmentsinc., 2002 Attachment Lineup Brochure 590797-0102, p. 19.
ceattachmentsinc., Brochure 590791-0302, center page, no date.
www.stumpcutters.com/model2500.html, Website page, Mar. 11, 2004.
www.stumpcutters.com/model7500.html, Website page, Mar. 11, 2004.

*Primary Examiner*—Robert E Pezzuto
(74) *Attorney, Agent, or Firm*—Brouse McDowell; Roger D. Emerson; Heather M. Barnes

(57) ABSTRACT

A vertical underground stump grinding apparatus having an elongated stump grinding tool rotatable about a vertical axis with cutting blades on the surface and a drilling end rotatably mounted on a vehicle such as a hydraulic excavator, skid steer loader, self propelled vehicle, or tow behind trailer which provide adequate power to rotate the tool and directional support to provide vertical movement into the ground adjacent the stump, transverse movement underground toward and in grinding engagement with the sides of the stump and removal by lifting out of the ground after the stump is ground away.

19 Claims, 13 Drawing Sheets

VERTICAL UNDERGROUND STUMP GRINDING APPARATUS

This is a continuation in part of U.S. patent application Ser. No. 10/305,541, which was filed Nov. 27, 2002 now U.S. Pat. No. 6,751,895.

BACKGROUND OF THE INVENTION

A. Field of Invention

This invention relates to a method and apparatus for grinding stumps with an elongated grinding tool rotatable about a generally vertical axis. The tool is mounted on a supporting vehicle which may be self powered or the supporting vehicle may provide power for rotating the tool. Piston cylinder assemblies on the vehicle provide vertical movement of the grinding tool into and out of the ground adjacent the stump and horizontal movement along the sides of the stump for grinding the stump.

B. Description of Related Art

Stump grinders of the type shown in applicant's U.S. Pat. No. 6,435,234 have disc cutters rotatable about a generally horizontal axis and are moved through the stump in a direction parallel with the axis of the cutter. This has the disadvantage of the drive shaft and bearings being below the ground level where they are exposed to dirt and rocks. Also, the debris which may include stones is thrown out of the hole in the ground which constitutes a safety problem.

Another problem with disc cutters rotatable about a horizontal axis is that they require relatively large diameter disc cutters in order to grind deep enough to remove the roots of medium and large stumps. The large diameter disc cutters require more power which cannot be supplied by small horsepower vehicles. The large diameter discs also may climb up on the stump being ground and upset the vehicle on which they are mounted.

Stump grinding tools rotatable about a vertical axis have been proposed as shown in U.S. Pat. Nos. 1,012,962 and 1,466,538 where the grinding tools are placed over the stump and grind it down to ground level. These patents including U.S. Pat. No. 3,818,957 which has a grinding tool rotatable about a vertical axis are directed to brush and tree cutting for land clearing and not to stump removal. Also, as stated in U.S. Pat. No. 3,818,957 "a shroud can be affixed to the outer portions of these elongate blades to retain dirt or earth removed by the blades at the sight—" This clearly indicates the grinding is done above the ground and not below the ground.

SUMMARY OF THE INVENTION

The present invention is directed to a stump grinder having an elongated grinding tool rotatable about a vertical axis for drilling into the ground adjacent a stump to a position below the ground and then moving horizontally into the sides of the stump where the debris and stones are thrown horizontally below the ground around the grinding tool. The debris which may be ejected above the ground is ground wood which does not constitute a serious hazard as do the stones which are located below the ground.

The grinder may be attached to equipment such as a skid steer vehicle, an articulated rubber tired vehicle, a hydraulic excavator, a self propelled vehicle or a tow behind trailer which provide a source of adequate power including internal combustion engines, electric power or the addition of PTO power hydraulic drive power to rotate the grinding tool.

In accordance with one aspect of the invention there is provided a stump grinding apparatus comprising a grinding tool support member, an elongated grinding tool mounted on the support member for rotation about a generally vertical axis of rotation, power means mounted on the support member and connected to the grinding tool for rotating the grinding tool, cutting teeth mounted on a stump grinding surface of the grinding tool, means to lower the support member and drive the rotating grinding tool into the ground at a position adjacent the stump, means to move the support member in a generally horizontal direction towards the stump to urge the rotating grinding tool and the cutting teeth of the stump grinding surface into a side of the stump underground, means to oscillate and curl the support member to move the grinding tool stump grinding surface along the buried surfaces of the stump to grind away the stump, and means to raise the support member to remove the grinding tool from the ground.

In accordance with another aspect of the invention there is provided a method of grinding a tree stump underground with an elongated generally cylindrical rotatable grinding tool having cutting blades on the generally cylindrical stump grinding surface of the tool comprising supporting an upper end of the grinding tool on a support member for rotation about a vertical axis, rotating the grinding tool by power means connected to an upper end of the grinding tool, lowering the grinding tool into the ground at a position adjacent the stump for penetrating the ground to a depth adjacent the roots of the stump, moving the grinding tool towards the stump to engage the sides of the stump, traversing the grinding tool along the sides of the stump to grind away portions thereof, raising the grinding tool out of the ground after the stump is ground away and stopping rotation of the grinding tool.

DETAILED DESCRIPTION OF THE INVENTION

Figure 1:
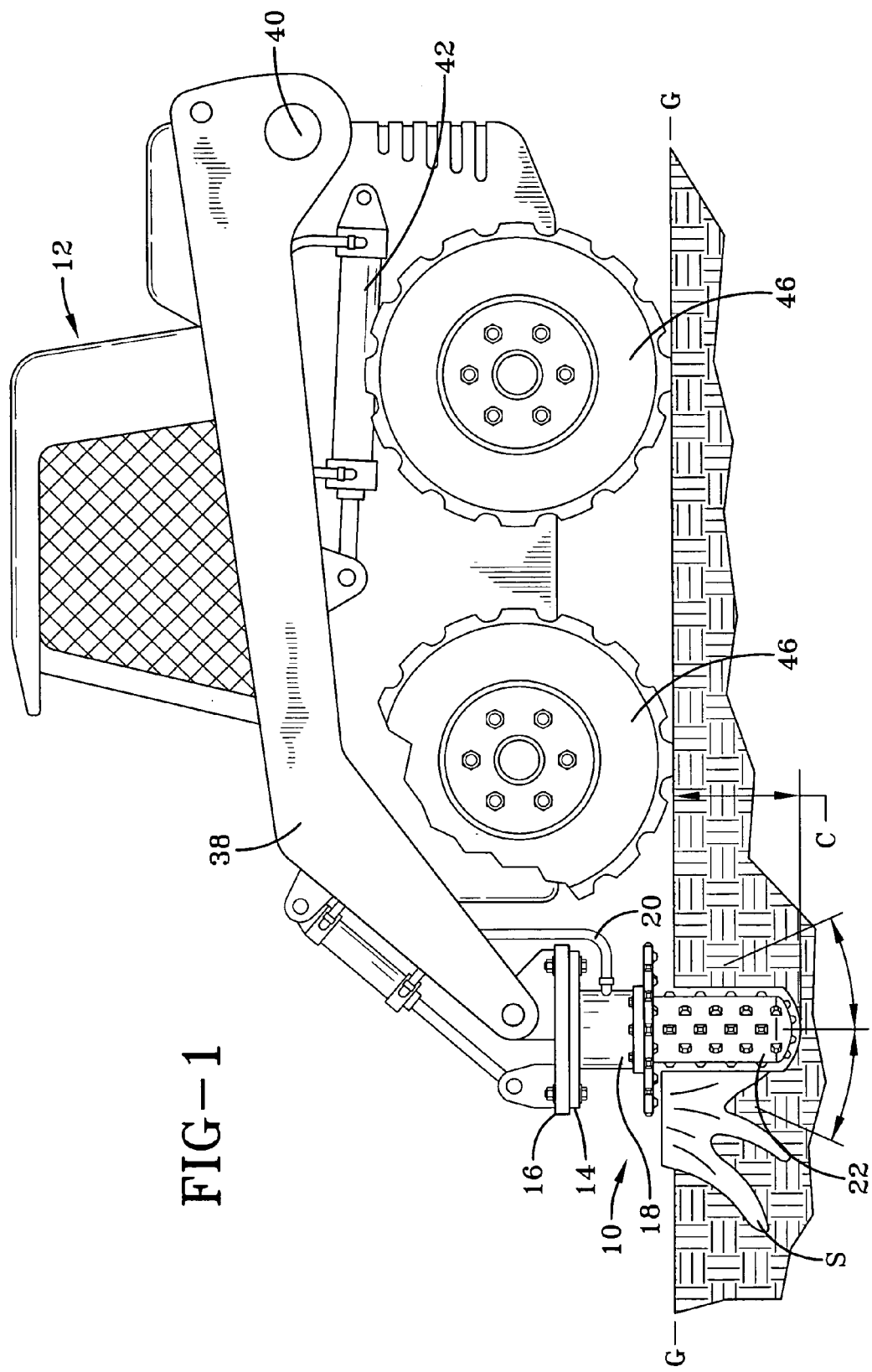
FIG. 1 is a side elevation of the stump grinding apparatus embodying the invention mounted on a skid steer vehicle showing the grinding tool in the underground operating position.
Figure 2:
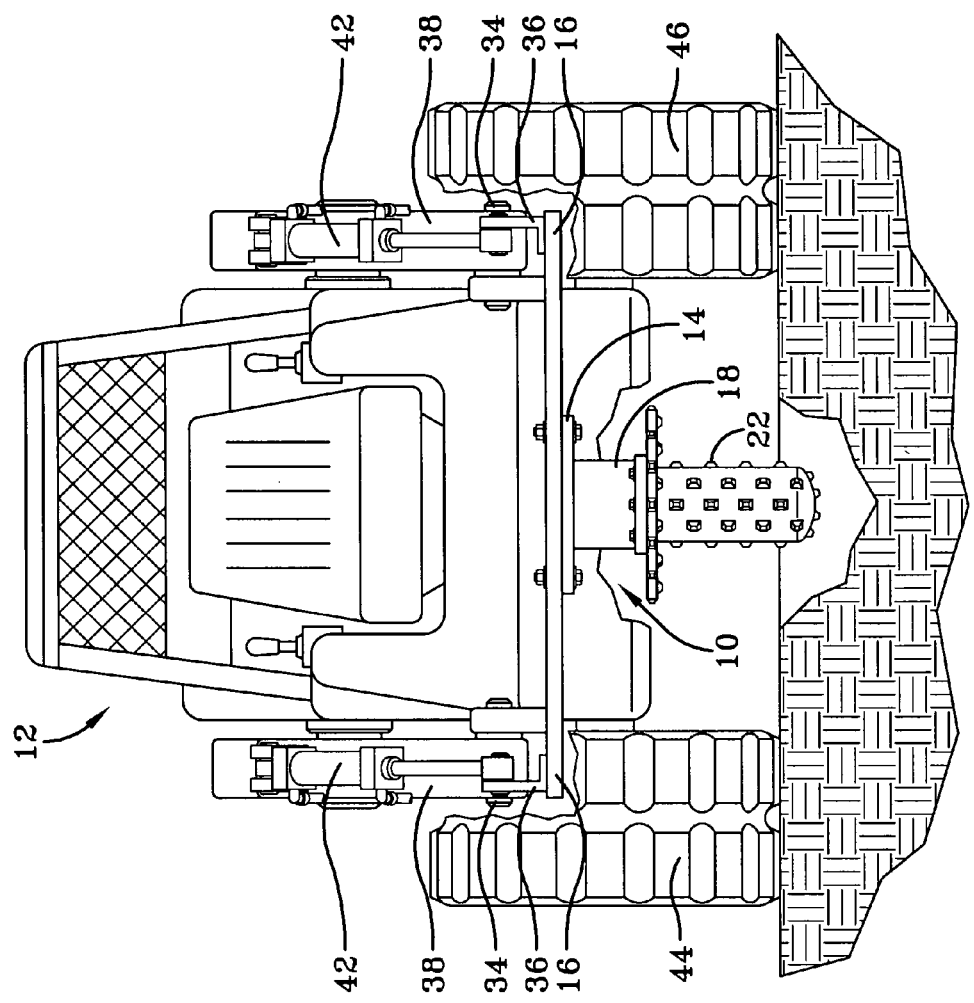
FIG. 2 is a front view of the stump grinding apparatus shown in FIG. 1 with the grinding tool in a partially raised position.
Figure 3:
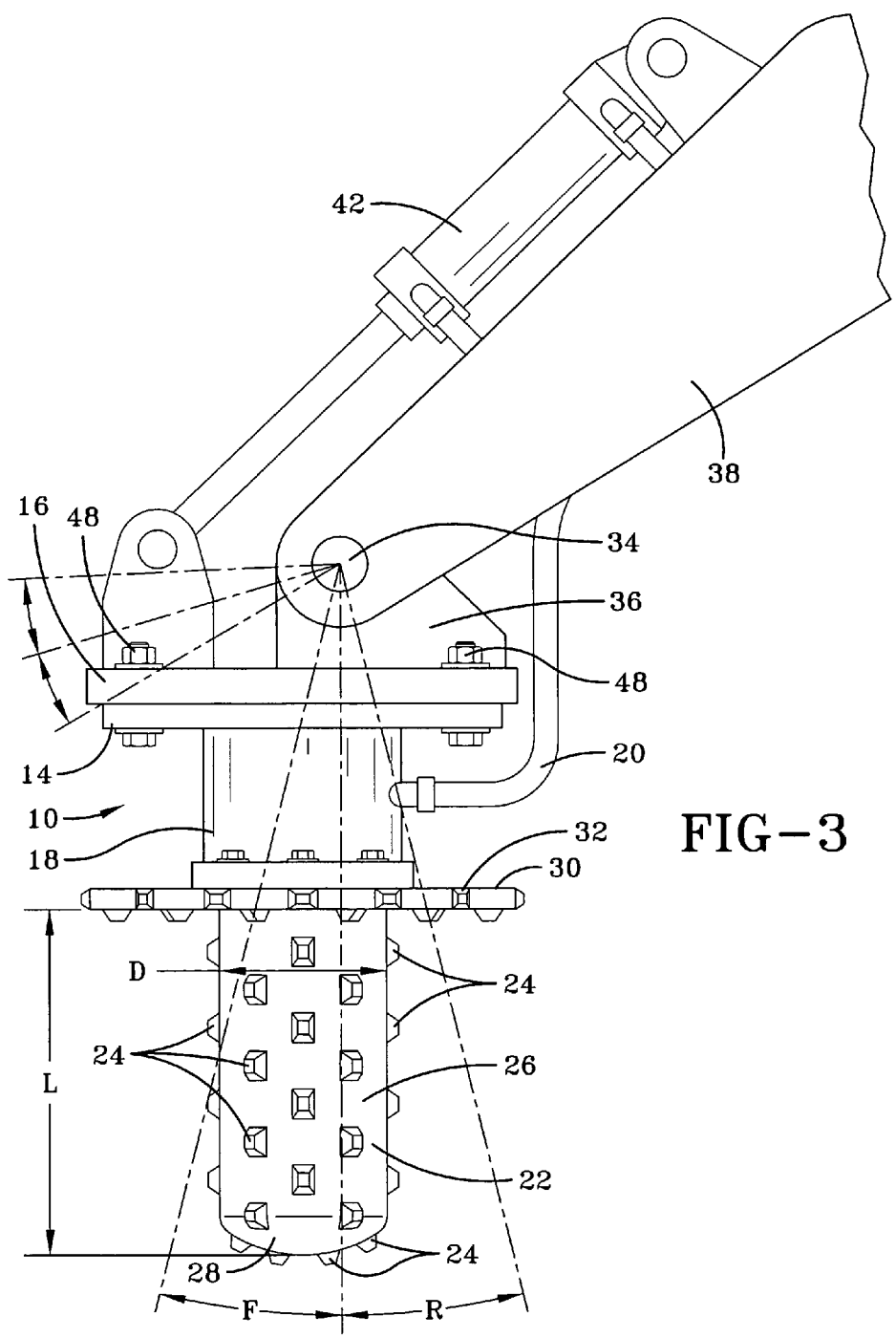
FIG. 3 is an enlarged fragmentary side elevation of the grinding tool shown in FIG. 1 illustrating the curling action of the tool provided by the bucket cylinder piston assembly.

Referring FIGS. 1, 2 and 3 a stump grinding apparatus 10 embodying the invention is shown mounted on a skid steer loader 12. The stump grinding apparatus has a support member or flange 14 mounted on a bucket beam 16 of the skid steer loader 12. The flange 14 may be for a hydraulic motor 18 having a hydraulic fluid pressure hose 20 connected to a hydraulic pump on the skid steer loader 12.

Mounted on the hydraulic motor 18 is an elongated grinding tool 22 which may be generally cylindrical as shown in FIG. 3 and have cutting teeth 24 mounted on a stump grinding surface 26 and a bottom drilling surface 28. A cutter plate 30 may be mounted at the top of the grinding tool 22 and extend outwardly from the grinding tool with top plate cutting teeth 32 extending outwardly from the edge of the top plate and below the edge.

The grinding tool 22 has a length "L" which is preferably equal to the depth of the stump S as shown in FIG. 1. This length "L" may be from 24 inches to 36 inches (60.96 centimeters to 91.44 centimeters). Depending on the power available the diameter "D" of the grinding tool 22 may be from 8 inches to 18 inches (20.32 centimeters to 45.72 centimeters). This provides a "L/D" length divided by diameter ratio in the range of 1.33 to 4.50.

The hydraulic motor 18 is mounted on the bucket beam 16 for curling movement forward "F" and rearward "R" about pins 34 pivotally mounted on brackets 36 mounted on the bucket beam and extending between a bucket boom 38 at each side of the skid steer loader 12. The bucket booms 38 are pivotally mounted on each side of the skid steer loader 12 for rotation about pivotal bearings 40 which may be bearings of a suitable type. The bucket booms 38 are moveable about the bearings 40 in response to extension and retraction of piston cylinder assemblies 42 extending between the body of the skid steer loader 12 and the bucket booms 38 for raising and lowering the bucket booms with the grinding tool 22 from a raised position above a ground level "G—G" to an underground position "U" as shown in FIG. 1.

Mounted on each of the bucket booms 38,38 are bucket boom piston cylinder assemblies 42 extending between the bucket booms 38 for tilting the grinding tool 22 in the forward "F" and rearward "R" directions.

The skid steer loader 12 has wheels 44 on one side and wheels 46 on the opposite side which are driven by hydraulic motors and can be rotated in opposite directions to swing the bucket beam 16 with the grinding tool 22 from side to side to provide transverse movement relative to the stump S. Also by rotating the wheels 44,46 in the same direction the bucket beam 16 along with the grinding tool 22 can be moved forward into engagement with the stump S.

Figure 6:
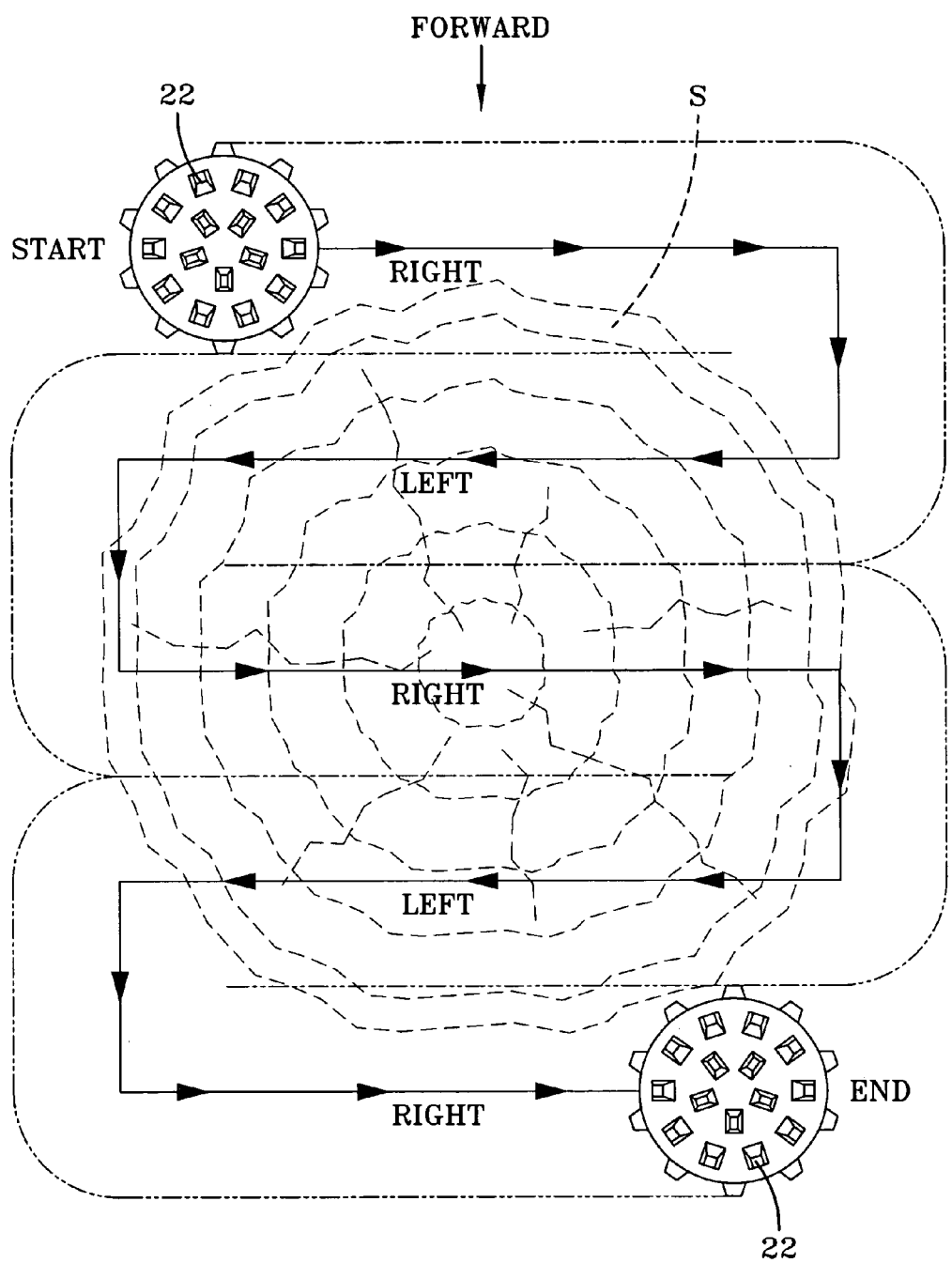
FIG. 6 is a schematic cross sectional view of the stump looking upward showing the cutting path of the grinding tool.

In operation the grinding tool 22 is mounted on the bucket beam 16 by fastening the flange 14 to the bucket beam by bolt fasteners such as nuts and bolts 48. The grinding tool 22 is lifted to a position spaced from the ground by actuating the bucket boom piston cylinder assemblies 42. A skid steer loader is then driven to a position with the grinding tool 22 positioned above the ground at a "start" position adjacent the root of the stump S as shown in FIG. 6. The grinding tool 22 is rotated by the hydraulic motor 18 and lowered for penetrating the ground to a depth adjacent the roots of the stump as shown in FIG. 1. The grinding tool 22 is then moved to the right by rotating the skid steer wheels 46 on one side in a forward direction and on the other side in a rearward direction to swing the bucket beam 16. Then the bucket beam piston cylinder assemblies 42 are actuated to swing the grinding tool 22 in a forward direction "F" as shown in FIG. 3 to further engage the stump S. Next the grinding tool 22 is moved to the left by rotating the wheels 44 and 46 in opposite directions to swing the bucket beam 16 to the left as shown by the arrows in FIG. 6. This action is continued back and forth and forward until the stump S is ground away. If necessary the forward movement of the grinding tool 22 can be provided by rotating the wheels 44 on one side and the wheels 46 on the opposite side in the same direction. When the grinding tool 22 reaches the "END" position the stump will have been ground away with the debris thrown into the ground. This is especially important in that the stones which are at the bottom of the stumps are not thrown out of the ground but into the ground. Normally the stump S is cut down to the ground level however with this grinding tool the wood from the stump is at the top and is less likely to cause damage.

After the stump has been ground away the bucket boom piston cylinder assemblies 42 are actuated to raise the grinding tool 22 out of the ground and the apparatus 10 is ready to move to another location for grinding another stump.

Figure 4:
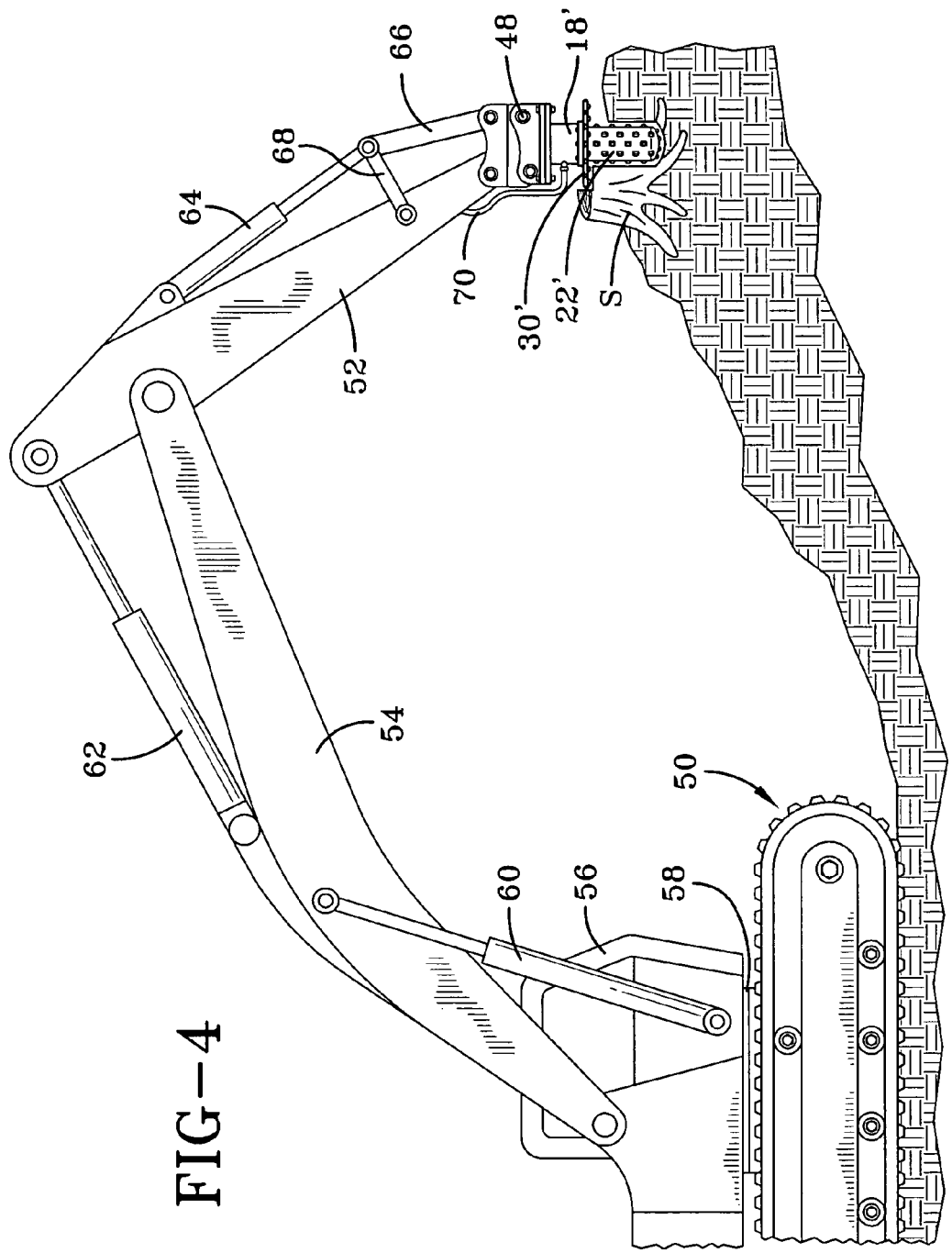
FIG. 4 is a side elevation of the stump grinding apparatus embodying the invention mounted on a hydraulic excavator showing the grinding tool in the underground operating position.
Figure 5:
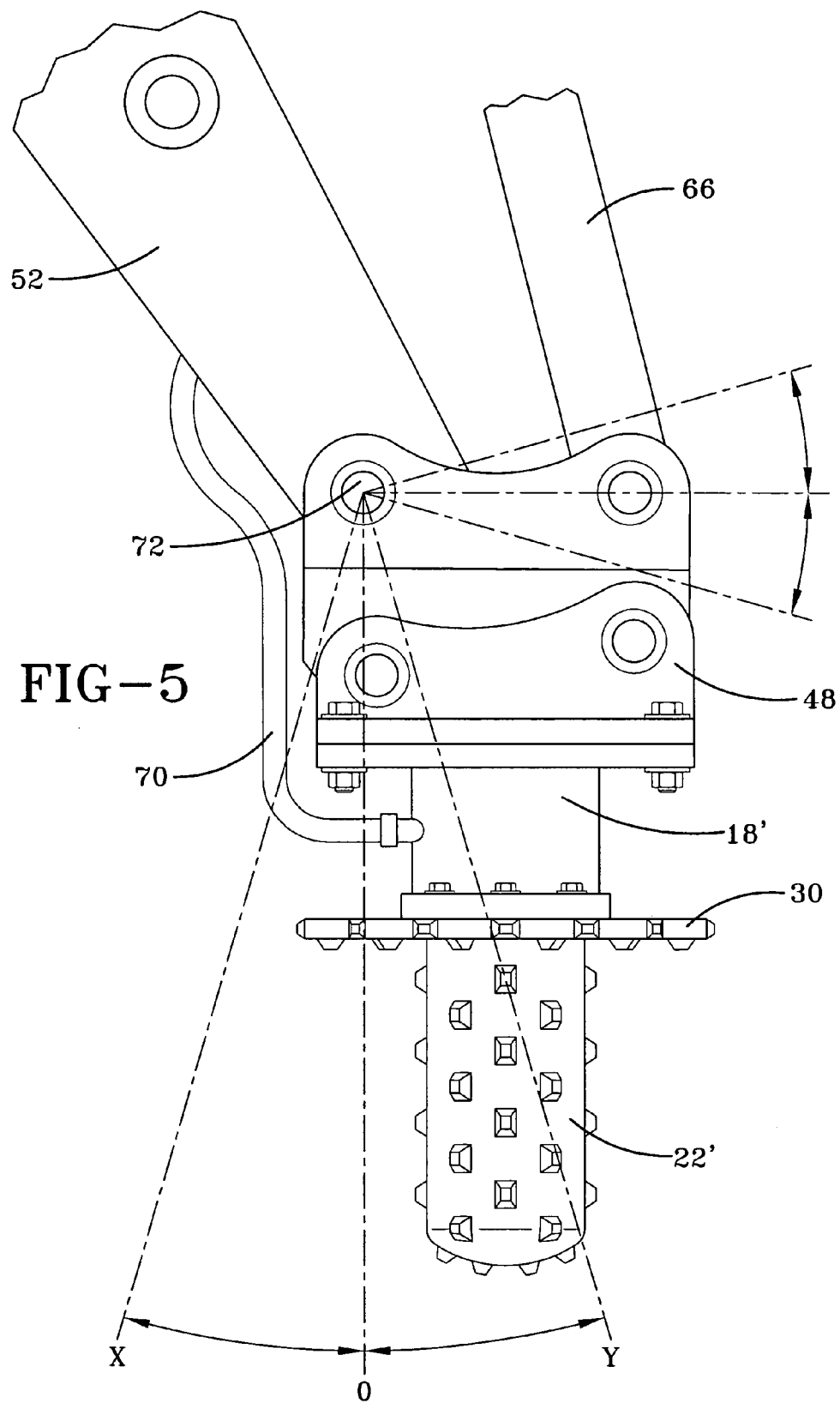
FIG. 5 is an enlarged fragmentary side elevation of the grinding tool shown in FIG. 4 illustrating the curling action of the tool provided by the link to the third hydraulic piston assembly mounted on the stick.

Referring to FIGS. 4 and 5 a modification is shown in which the grinding tool 22' is supported on the hydraulic motor 18' which is mounted on a quick coupling connection 48 of a hydraulic excavator 50. A quick coupling connection 48 is mounted rotatably on a stick 52 pivotally mounted on a boom 54 which in turn is pivotally mounted on a housing 56 supported on a platform 58. The platform 58 swings about a vertical axis to provide transverse movement of the cutting tool 22' into engagement with the stump S. The boom 54 is moveable in a vertical direction by a first hydraulic piston cylinder assembly 60. The stick 52 moves the quick coupling connection 48 and the grinding tool 22' attached to it by a second hydraulic piston cylinder assembly 62. Curling action of the grinding tool 22' is provided by a third hydraulic piston cylinder assembly 64 attached to the quick coupling connection 48 through a link 66 pivotally mounted on a toggle arm 68 connected to the stick 52.

A hydraulic fluid pressure hose 70 in communication with a hydraulic pump on the excavator housing 56 provides power for rotating the grinding tool 22'.

In operation the excavator 50 is moved to a position near the stump S and the grinding tool 22' is moved to a position adjacent the stump S corresponding to the "start" position shown in FIG. 6. The grinding tool 22' is rotated by the hydraulic motor 18' and lowered to drill an opening in the ground next to the stump S. This may be done by the first hydraulic piston cylinder assembly 60 lowering the boom 54. A grinding tool 22' may then be moved along the cutting path shown in FIG. 6 by rotating the platform 58 of the excavator in a first direction. The grinding tool 22' may then be moved to the second path by curling the tool 22' into the stump through actuation of the third hydraulic piston cylinder assembly 64 causing the curling action about pivot pin 72. This curling action is shown schematically with the grinding tool being moveable from the position "O" to positions "X" and "Y" as shown in FIG. 5.

If necessary the grinding tool 22' may be moved with the quick coupling connection 48 into the stump S by actuating the second hydraulic piston cylinder assembly 62. When the stump S has been ground away the grinding tool 22' may be pulled out of the ground by actuating the first hydraulic piston cylinder assembly 60 causing the boom 54 to rotate in a counterclockwise direction as shown in FIG. 4.

Figure 7:
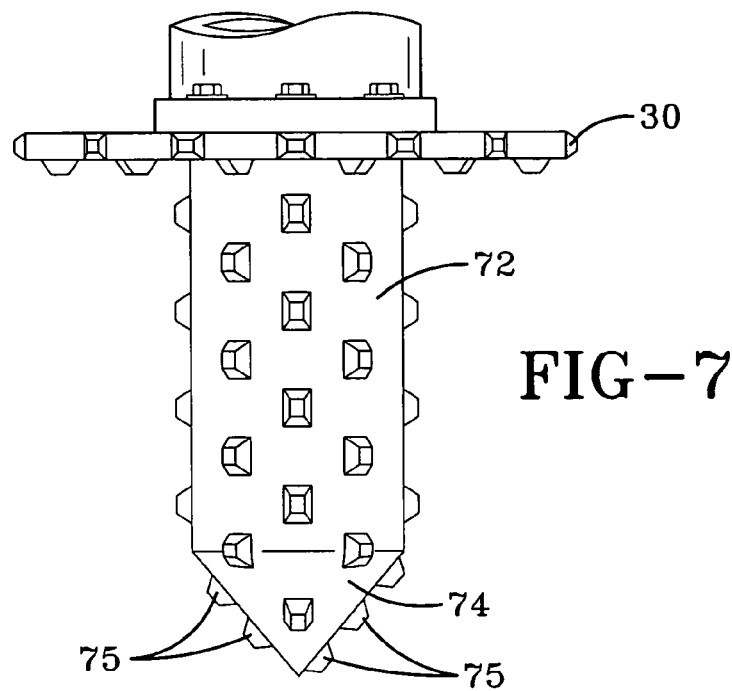
FIG. 7 is a side view of a grinding tool modification having a conical end and a cylindrical body.

Referring to FIG. 7 a modified grinding tool 72 which is cylindrical and has the same shape as the grinding tool 22 however a conical pointed end having cutting teeth 75 is provided to facilitate drilling the grinding tool into the ground adjacent the stump S.

Figure 8:
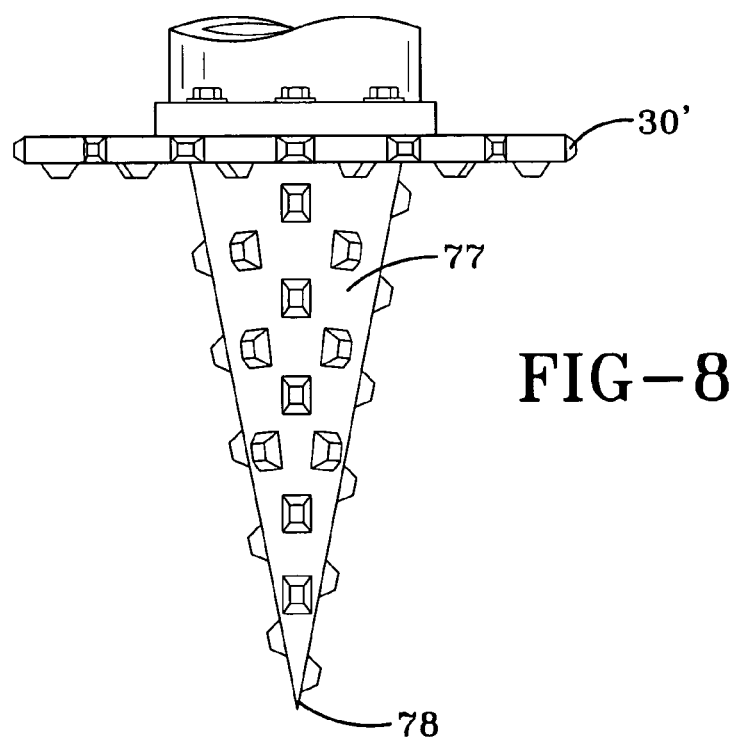
FIG. 8 is a side view of another grinding tool modification having a conical shape.

A further modification is shown in FIG. 8 where a grinding tool 77 has a conical shape from the cutter top plate 30' to the pointed lower end 78. This grinding tool 77 may be advantageous where the ground surrounding the stump S is difficult to penetrate because of rocks or other soil conditions.

Figure 9:
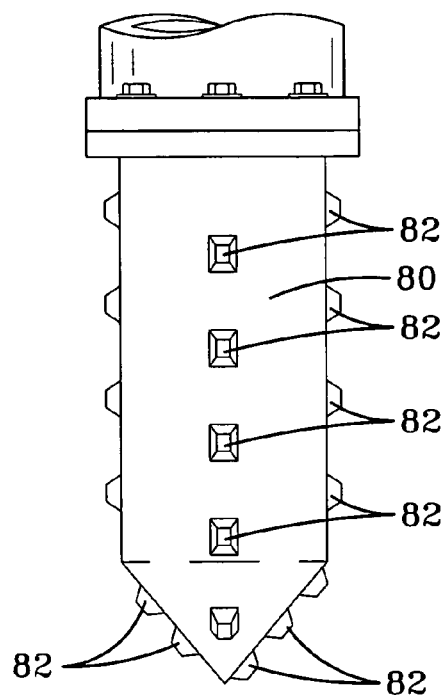
FIG. 9 is another grinding tool modification having teeth positioned in a spiral pattern.
Figure 10:
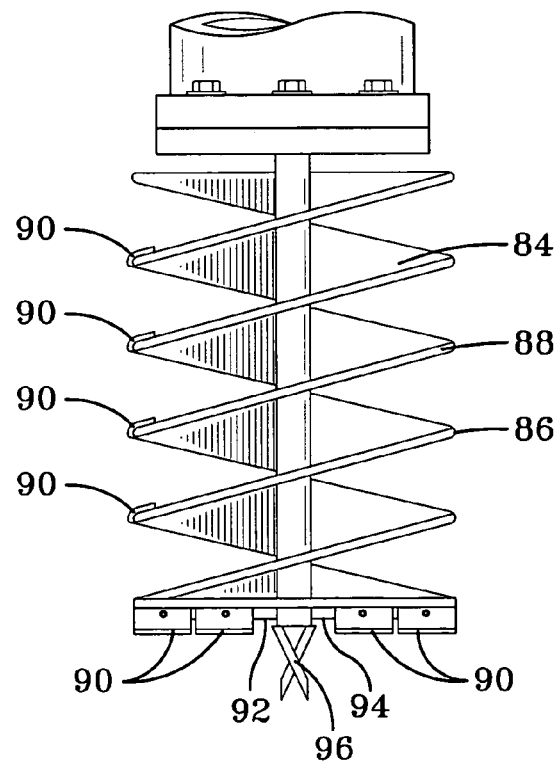
FIG. 10 is another grinding tool modification where the grinding tool has an auger shape.

A still further modified grinding tool 80 is shown in FIG. 9 where the teeth 82 are positioned in a spiral pattern and have a generally helical shape for urging the debris from grinding upward to a position at the surface of the ground. Where the ground is very hard an auger type grinding tool 84 shown in FIG. 10 may be desirable. This tool 84 has an auger shape with helical edges 86 and 88 for lifting the debris out of the ground. Also carbide teeth 90 are mounted on the helical edges 86,88 as well as on bottom edges 92 and 94. A centering prong 96 may be mounted on the bottom of the tool 80.

Figure 11:
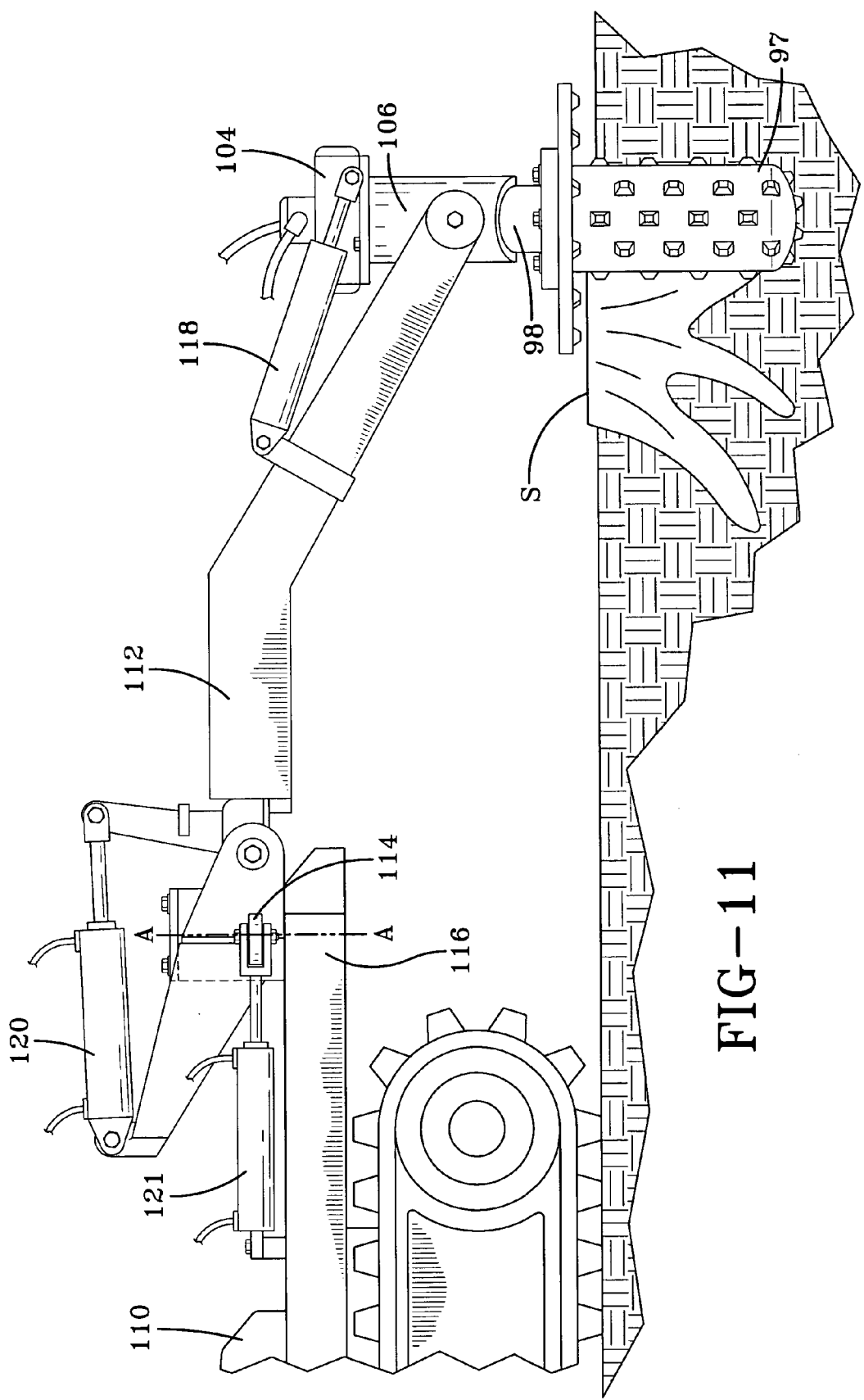
FIG. 11 is a side elevation of the stump grinding apparatus embodying the invention mounted on a self propelled vehicle with the grinding tool in the underground operating position.
Figure 12:
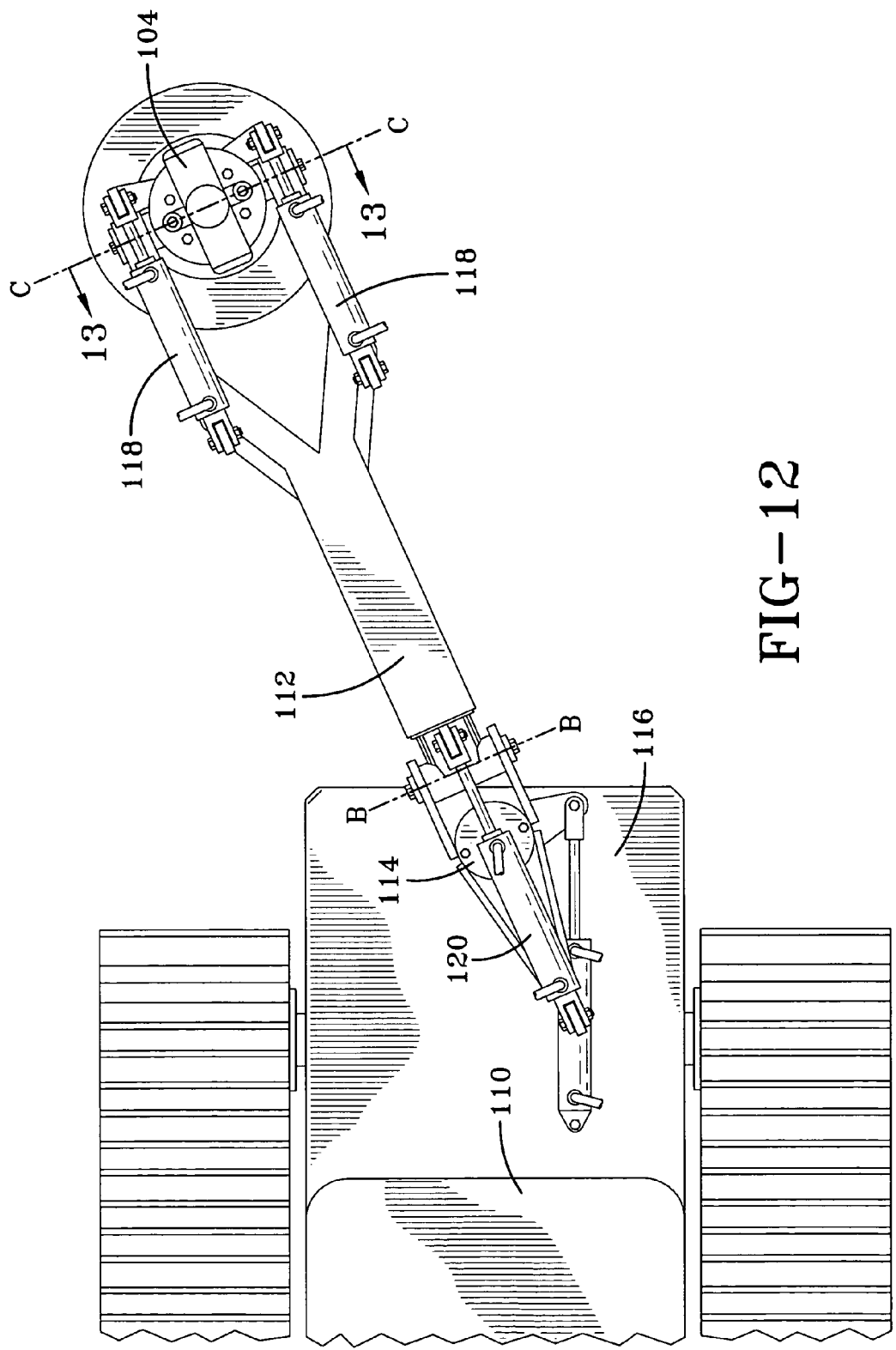
FIG. 12 is a plan view of the stump grinding apparatus shown in FIG. 11.
Figure 13:
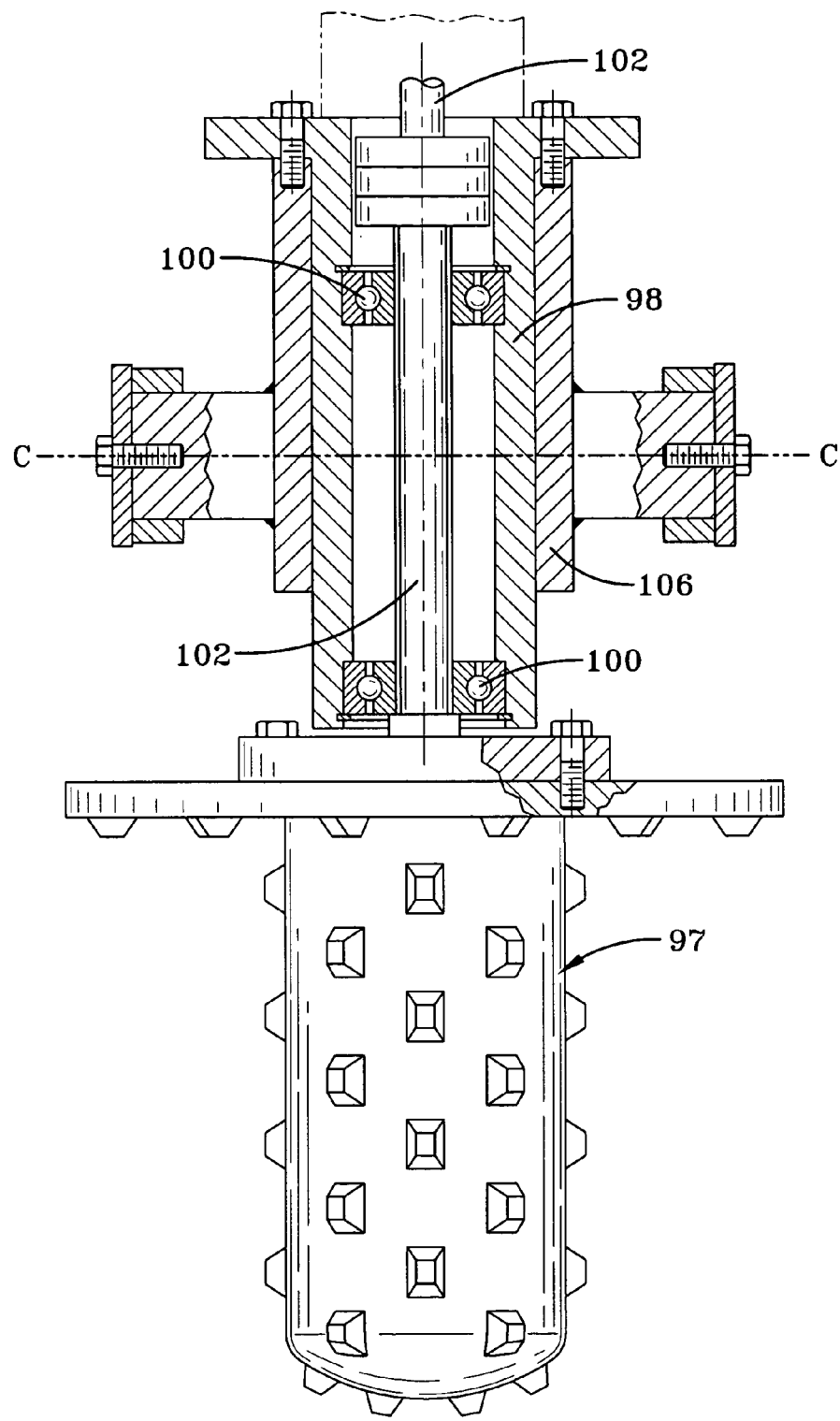
FIG. 13 is a fragmentary sectional view of the tool support member taken along the plane of line 13—13 shown in FIG. 12.

Referring to FIGS. 11, 12, and 13 another modification of the invention is shown in which the grinding tool 97 is supported on a support member such as a sleeve 98 having bearings 100 for a shaft 102 which connects to a hydraulic motor 104 for rotating the grinding tool. The sleeve 98 includes cylindrical support 106 on which the hydraulic motor 108 is mounted.

A self propelled vehicle 110 supports the cylindrical support 106 for the grinding tool 97 by means of a boom 112 rotatably mounted for rotation about a vertical axis A—A and about a horizontal axis B—B on a swivel member 114 fastened to a supporting plate 116 of the vehicle 110. A first hydraulic piston cylinder assembly 118 having two pistons and cylinders connects the boom 112 and the cylindrical support 106 providing rotation of the grinding tool 97 about an axis C—C. A second hydraulic piston cylinder assembly 120 connects the second member 114 with the boom 112 for raising and lowering the boom. A third hydraulic piston cylinder assembly 121 connects the self propelled vehicle 110 with the swivel member 114 for moving the boom 112 in a horizontal swinging direction to provide oscillation of the cylindrical support 106 from side to side of the stump. A source of hydraulic fluid under pressure such as a pump may be provided by a hydraulic pump mounted on the self propelled vehicle. Control means not shown may be provided for an operator to control the movement of the grinding tool 97 in a vertical direction and a horizontal direction and urge the grinding tool 97 into the ground and then into the side of the stump by controlling the hydraulic pressure in the first, second, and third piston cylinder assemblies 118, 120, and 121.

Figure 14:
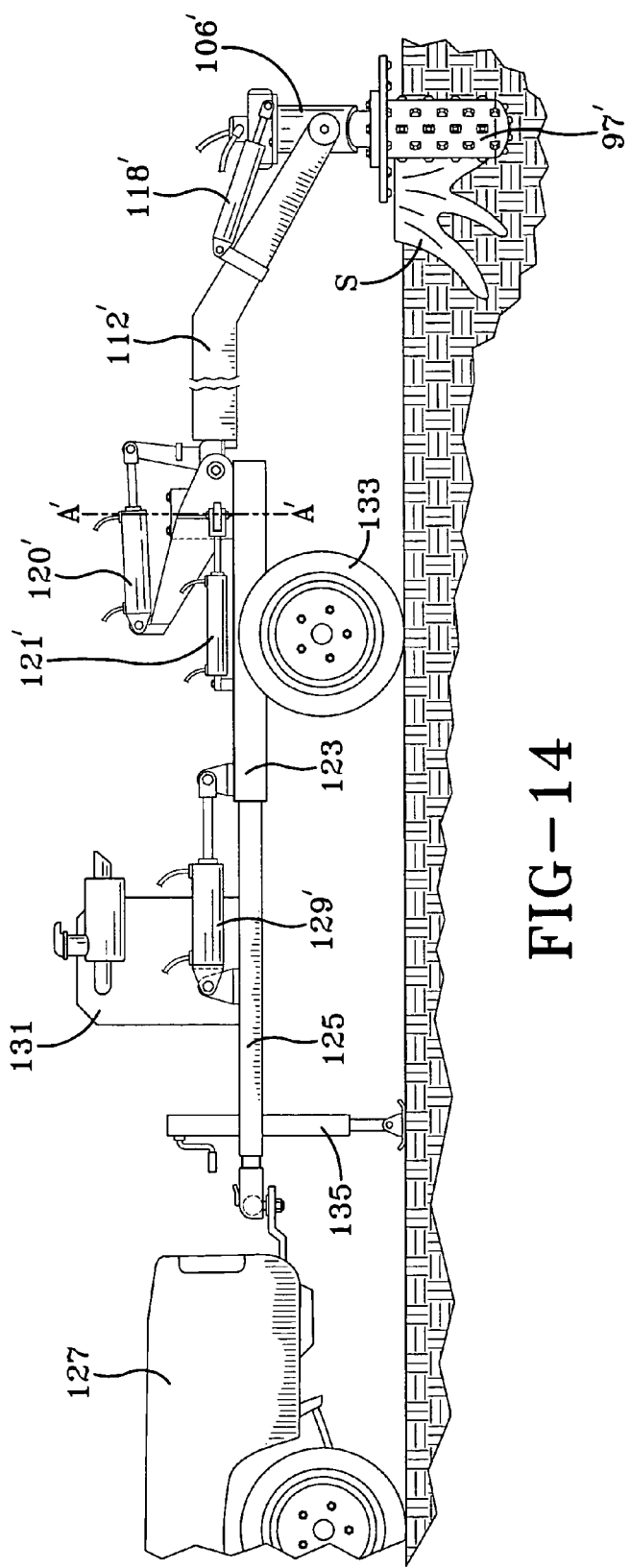
FIG. 14 is an elevation of a grinding apparatus embodying the invention mounted on a tow behind trailer.
Figure 15:
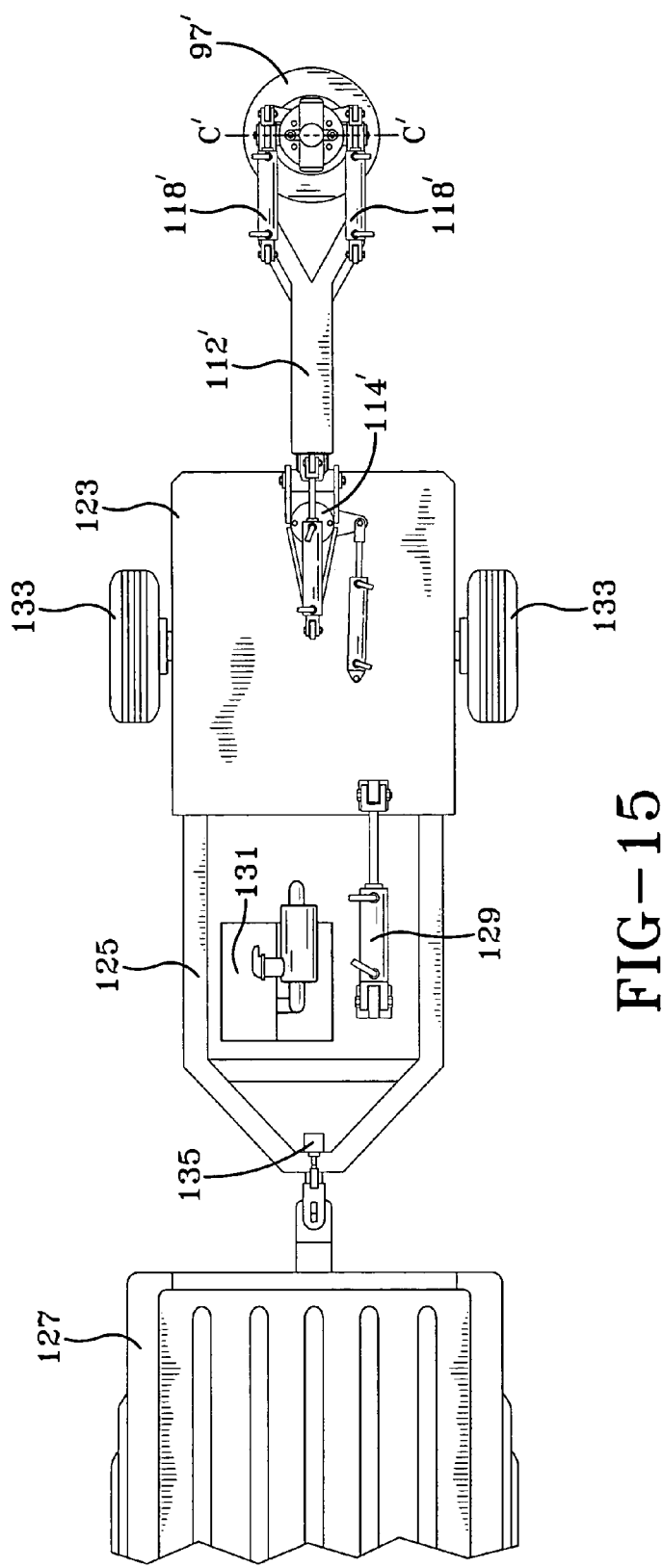
FIG. 15 is a plan view of the stump grinding apparatus shown in FIG. 14.

Referring to FIGS. 14 and 15 a still further modification of the invention is shown where the apparatus embodying the invention is mounted on a tow behind trailer 122. The grinding tool 97' is shown supported on apparatus like that shown and described for the embodiment of FIGS. 11, 12, and 13 where similar parts have been given the same numeral with the addition of a prime symbol. In this embodiment the swivel member 114' is mounted on a grinder frame 123 slidably mounted on a trailer frame 125 for a movement of the grinder frame 123 carrying the boom 112' toward and away from the stump without moving the trailer frame 125 or a vehicle 127 to which it may be attached. A fourth piston cylinder assembly 129 connects the grinder frame 123 and trailer frame 125 for moving the grinder frame 123 and the support member 98' in a generally horizontal direction to urge the rotating grinding tool 97' toward the stump. A stand alone hydraulic motor 131 may be mounted on the grinder frame 123 for supplying hydraulic fluid under pressure to the first 118', second 120', third 121', and fourth 129 hydraulic piston cylinder assemblies. Control means may be provided to move the grinding tool 97' into the ground in oscillation for grinding the stump underground.

In operation the tow behind apparatus shown in FIGS. 14 and 15 is moved into position by the vehicle 127 and the trailer frame 125 is supported on wheels 133 and a stand 135 at which time the vehicle 127 can be driven away. The hydraulic pump and motor 131 may then be started and provide hydraulic fluid under pressure to the first, second, third, and fourth hydraulic piston cylinder assemblies 118' 120' 121 ' 129. Control means not shown connected to these piston cylinder assemblies may then be used to operate the apparatus as follows:

The fourth hydraulic piston cylinder assembly 129 may be activated to move the grinder frame 123 towards the stump S to a position with the grinder tool 97' over the stump S. The first hydraulic piston cylinder assembly 118' may be actuated to rotate the grinding tool 97' about an axis C—C placing the grinding tool 97' in a vertical position next to the stump S. The second hydraulic piston cylinder assembly 120' is then actuated to lower the boom 112' and drive the rotating grinding tool 97' into the ground next to the stump S as shown in FIG. 14. The third hydraulic piston cylinder assembly 121' may then be actuated to move the boom 112' horizontally to provide oscillation of the boom with the grinding teeth engaging the stump.

After the stump S is ground away the rotation of the grinding tool 97' may be stopped and the tool removed from the ground by actuating the third hydraulic piston cylinder assembly 121'. The hydraulic motor 131 may be shut down and the vehicle 127 hitched to the trailer frame 125. Then the stand 135 may be removed or shifted to an up position and the apparatus towed away.

While certain representative embodiments and details have been shown for the purpose of illustrating the invention it will be apparent to those skilled in the art that various changes and modifications may be made therein without departing from the scope of the invention.

What is claimed is:

1. A stump grinding apparatus comprising
   (a) a grinding tool support member;
   (b) an elongated grinding tool mounted on said support member for rotation about a generally vertical axis of rotation;
   (c) power means mounted on said support member and connected to said grinding tool for rotating said grinding tool;

(d) cutting teeth mounted on a stump grinding surface of said grinding tool;

(e) means to lower said support member and drive said rotating grinding tool into the ground at a position adjacent said stump;

(f) means to move said support member in a generally horizontal direction toward said stump to urge said rotating grinding tool and said cutting teeth of said stump grinding surface into a side of said stump and throw the debris horizontally underground;

(g) means to oscillate and curl said support member to move said grinding tool stump grinding surface along the buried surfaces of said stump to grind away said stump; and (h) means to raise said support member to remove said grinding tool from the ground;

wherein said support member is mounted on a tow behind trailer.

2. The stump grinding apparatus in accordance with claim 1 further comprising said grinding tool having a generally cylindrical shape to facilitate driving said grinding tool into the ground adjacent the stump and for rotating said grinding tool in the ground.

3. The stump grinding apparatus in accordance with claim 2 wherein said grinding tool has a conical end portion for penetrating the ground.

4. The stump grinding apparatus in accordance with claim 2 wherein said grinding surface is tapered with a "L/D" length divided by diameter ratio in the range of 1.33 to 4.50.

5. The stump grinding apparatus in accordance with claim 2 wherein said grinding tool is in the shape of a frustum of a cone.

6. The stump grinding apparatus in accordance with claim 1 wherein said power means is a hydraulic motor for connection to a source of hydraulic fluid under pressure.

7. The stump grinding apparatus in accordance with claim 1 further comprising a cutting flange mounted on the upper end of said grinding tool for cutting brush.

8. The stump grinding apparatus of claim 1 further comprising said support member being mounted on a vehicle, said vehicle being said tow behind trailer, said vehicle having said means to raise and lower said support member, said means to move said support member in a generally horizontal direction, and said means to oscillate and curl said support member.

9. The stump grinding apparatus in accordance with claim 8 wherein said vehicle is a skid steer loader, said support member is mounted on a bucket beam, said bucket beam is mounted on bucket booms having pivotal connections to said vehicle, said bucket booms being moveable vertically by bucket boom piston cylinder assemblies, said bucket beam being moveable transversally by rotating wheels on one side of said vehicle in the opposite direction to rotation of wheels on the other side and said bucket beam being moveable in a curling motion by actuating a bucket beam piston cylinder assembly.

10. The stump grinding apparatus in accordance with claim 8 wherein said vehicle is a hydraulic excavator and said support member is a quick coupling connector mounted on a stick member, said stick member is pivotally mounted on a boom, said boom being pivotally mounted on an excavator platform, said platform being rotatable about a generally vertical axis and said quick coupling connector being moveable vertically by a first hydraulic piston cylinder and being moveable transversely by rotation of said excavator platform and said support member being moveable in a curling action by a third hydraulic piston cylinder assembly positioned between said quick coupling connector and said stick.

11. The stump grinding apparatus of claim 1 further comprising said grinding tool having a conical pointed end for penetrating the ground.

12. The stump grinding apparatus of claim 1 further comprising said grinding tool being conical in shape.

13. The stump grinding apparatus of claim 2 further comprising said cutting teeth being positioned on said cylindrical shaped stump grinding surface in a spiral pattern and having a generally helical shape for facilitating penetration of the ground adjacent said stump and for lifting said debris out of the ground.

14. The stump grinding apparatus of claim 1 further comprising said grinding tool having the shape of an auger having helical edges and bottom edges, and said carbide teeth being mounted on said helical edges and said bottom edges.

15. The stump grinding apparatus in accordance with claim 8 wherein said vehicle is a self propelled vehicle, said support member is pivotally mounted on a boom for swinging movement about a horizontally axis, said boom is rotatably mounted on a swivel member mounted on said vehicle providing for rotation of said boom about a vertical axis and vertical movement about a horizontal axis, a first hydraulic piston cylinder assembly connecting said support member and said boom for swinging said support member to maintain said grinding tool in a vertical position, a second hydraulic piston cylinder assembly connecting said swivel member and said boom for raising and lowering said boom, a third hydraulic piston cylinder assembly connecting said vehicle and said swivel member for moving said boom horizontally to provide oscillation of said support member and said self propelled vehicle being movable toward said stump to move said support member in a generally horizontal direction to urge said rotating grinding tool into a side of said stump.

16. The stump grinding apparatus in accordance with claim 15 further comprising a hydraulic pump on said vehicle connected to said first second and third hydraulic piston cylinder assemblies and control means for directing the hydraulic pressure in said piston cylinder assemblies to control the movement of said grinding tool.

17. The stump grinding apparatus in accordance with claim 8 wherein said tow behind trailer has a grinder frame slidably mounted on a trailer frame, said support member is pivotally mounted on a boom for swinging movement about a horizontal axis, said boom is rotatably mounted on a swivel member fastened to said grinder frame for movement toward and away from said stump and for rotation of said boom on said swivel member about a vertical axis and for vertical movement of said boom about a horizontal axis, a first hydraulic piston cylinder assembly connecting said support member and said boom for swinging movement of said support member to maintain said grinding tool in a vertical position, a second hydraulic piston cylinder assembly connecting said swivel member and said boom for raising and lowering said boom, a third hydraulic piston cylinder assembly connecting said grinder frame and said swivel member for moving said boom horizontally to provide oscillation of said support member, a fourth hydraulic piston cylinder assembly connecting said grinder and said trailer frame for moving said grinder frame and said support member in a generally horizontal direction to urge said grinding tool into a side of said stump.

18. The stump grinding apparatus in accordance with claim 17 wherein a hydraulic pump and motor assembly is mounted on said grinder frame with connections to said first, second, third, and fourth piston cylinder assemblies for providing hydraulic fluid under pressure and control means connected to said first, second, third, and fourth piston cylinder assemblies for controlling the hydraulic fluid under pressure to said piston cylinder assemblies for operating said apparatus.

19. A method of grinding a tree stump underground with an elongated generally cylindrical rotatable grinding tool having cutting blades on the generally cylindrical stump grinding surface of said tool comprising:

(a) supporting an upper end of said grinding tool on a support member for rotation about a vertical axis, said support member being mounted on a tow behind trailer, (b) rotating said grinding tool by power means connected to an upper end of said grinding tool, (c) lowering said grinding tool into the ground at a position adjacent said stump for penetrating the ground to a depth adjacent the roots of said stump, (d) moving said grinding tool towards said stump to engage the sides of said stump, (e) traversing said grinding tool along the sides of said stump to grind away portions thereof, (f) raising said grinding tool out of the ground after the stump is ground away, and (g) stopping the rotation of said grinding tool.

* * * * *